July 7, 1942.  E. W. PIKE ET AL  2,288,838
VIBRATION PICKUP DEVICE
Filed Feb. 29, 1940   2 Sheets-Sheet 1
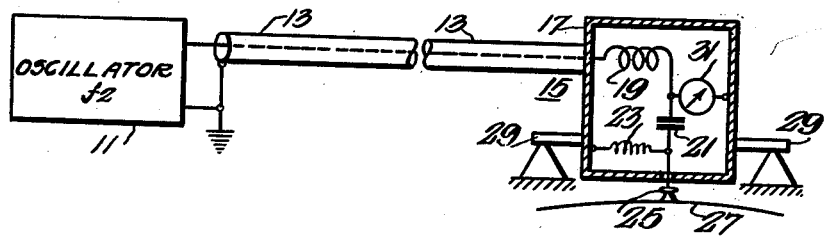
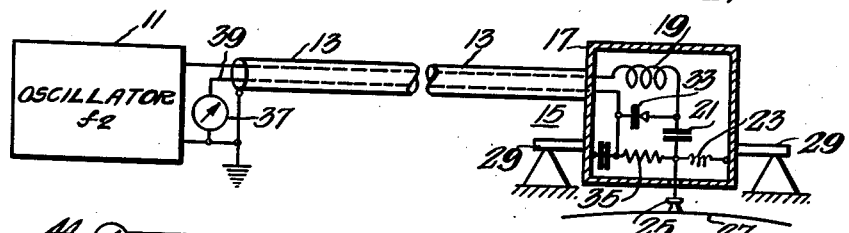
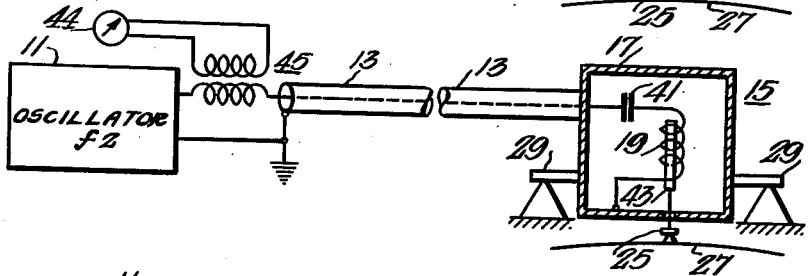
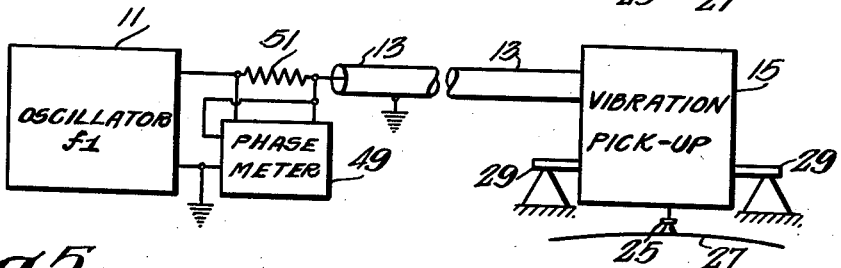
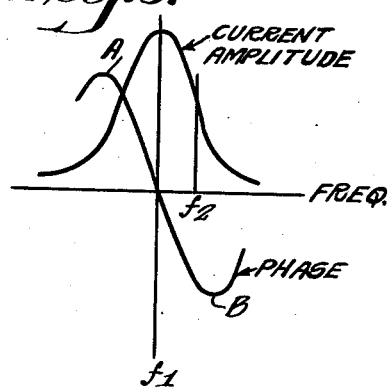
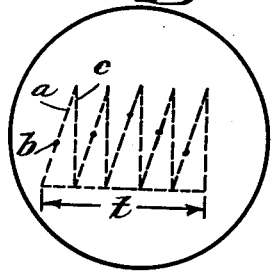
Inventors
Eugene W. Pike
& Arthur W. Vance
By
Attorney July 7, 1942.  E. W. PIKE ET AL  2,288,838
VIBRATION PICKUP DEVICE
Filed Feb. 29, 1940  2 Sheets-Sheet 2
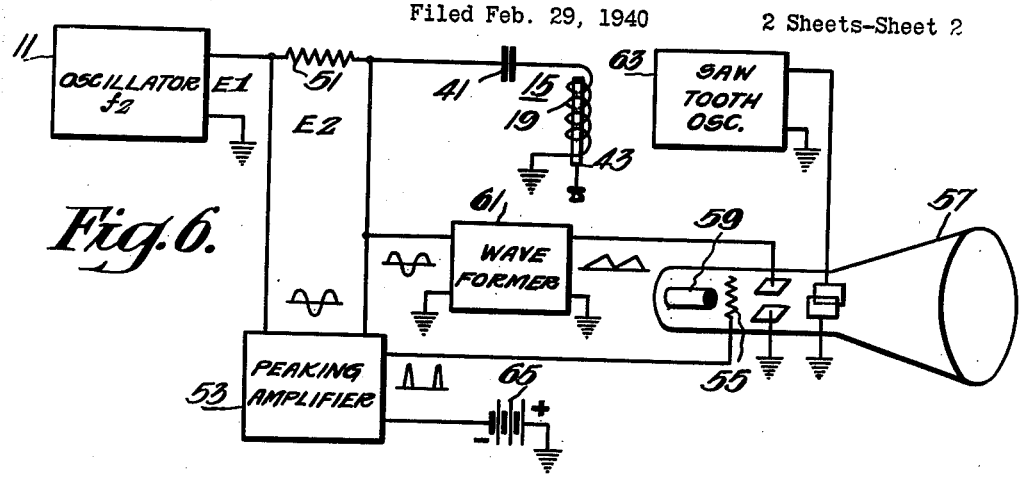
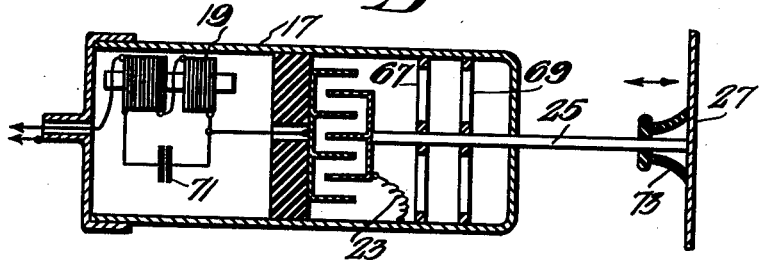
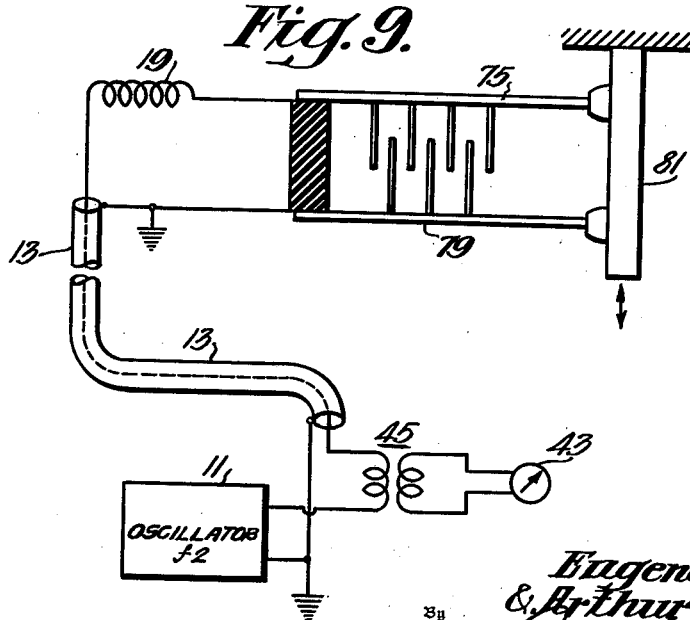
Inventors
Eugene W. Pike
& Arthur W. Vance
Attorney Patented July 7, 1942

2,288,838

UNITED STATES PATENT OFFICE 2,288,838

VIBRATION PICKUP DEVICE

Eugene W. Pike, Swarthmore, Pa., and Arthur W. Vance, Haddonfield, N. J., assignors to Radio Corporation of America, a corporation of Delaware Application February 29, 1940, Serial No. 321,536

7 Claims. (Cl. 177—351)

This invention relates to a method of and an apparatus for indicating the variations of position of an object, particularly of a vibrating object.

In designing a machine or device which is subject to vibration, as, for example, aircraft, it is frequently desirable to be able to analyze the nature of the vibration taking place in its various parts. Unnecessary vibration may give rise to unpleasant noise or other undesirable sensations in persons nearby, and the rapidly variable stresses bring about the failure at low stresses known as "fatigue failure," and decrease thereby the safety factor of any given construction. It is the primary object of this invention to provide a pick-up device suitable for the measurement and analysis of the vibration and the permanent displacement of members under stress which has a minimum effect on the object or surface under observation.

Generally speaking, there are three types of measurements which are of significance in the analysis of the frequency and amplitude of vibration in solid bodies. In the first type, the motion of the point or object in question is referred to some arbitrarily selected fixed point—the hand of the operator, a bolt head, or some other object. In this case one portion of the pick-up device is attached to the reference point, another part to the object under study, and their relative motion controls the response of the device. In the second type, the motion of the point in question is referred to the local inertial reference frame; in practice, a freely suspended heavy mass is used as the reference point. Seismographs, geophones, automotive "ride meters" and the RCA "free corner" pickup make this type of measurement. Such devices are most useful when dealing with very large isolated masses, such as the earth, or with the comfort of persons in or near the objects studied. The third type of measurement is that in which the indicator is connected between two spaced points of a given object, the variation in the distance between the spaced points indicating the variations in the stress in the object.

The nature of the vibrations which are present in a vibrating system may be extremely complex. It is well known that an elastic body is resonant at a great number of different frequencies, each characteristic of a particular mode of vibration. However, the vibration of the body excited by any particular periodic driving force (such as an unbalanced shaft) is a combination of a few of those modes whose resonant frequencies are nearest that of the driving force. In consequence, relatively small changes in the form or mass of the loading of the vibrating object may cause large changes in the vibration by so shifting the spectrum of resonant frequencies past the fixed driving frequency that different modes of vibration are excited. If this change in mass or stiffness is due to a vibration indicator attached to the object, then the indications of the pick-up may bear no necessary resemblance to the vibration pattern of the original unloaded object.

Vibration or position sensitive pick-ups of the type which are now commercially available have considerable mass or add a considerable stiffness to the surface under measurement. It is therefore a further object of our invention to provide a vibration pick-up which presents a negligible impedance to the point to which it is attached so that the vibration pattern is not seriously distorted.

The known vibration pick-ups may be divided into three classes: acceleration, velocity and static. The acceleration type is responsive to changes in the velocity of the vibrating surface. The "free corner" piezo-electric pick-up, which is an example of the acceleration type, comprises a housing and a piezo-electric crystal mounted on the housing at three of its corners but having its fourth corner unconnected. The outer voltage is developed by the inertia of the free corner which tends to lag behind the motion imparted to the housing by the vibrating system. Since the output voltage is a function of the change of velocity of the vibrating system this type of pick-up is not position sensitive, that is, no output voltage is derived from static changes in the position of the vibrating member, and it derives its output energy directly from the vibrating system.

The velocity type pick-up is commonly employed for the measurement of audio vibrations, but like the acceleration type described above it extracts energy from the vibrating member and, is not position sensitive. Furthermore, the velocity type pick-up has a poor response to very low audio frequency vibrations.

The third class of pick-ups is the static or position type which includes mechanical and optical micrometers, carbon compression pick-ups, and variable reactance pick-ups. For providing a pick-up which operates from zero frequency to a substantially high frequency, which extracts very little energy from the vibrating system, and which presents the minimum impedance to the point of contact, the known mechanical methods are generally unsatisfactory. Optical methods are unsuited to many uses due to the weight of the apparatus required and the nature of the indication.

The electrostatic capacity voltmeter and the capacity micrometer, in which a variation of capacity varies the frequency of oscillation of a radio frequency oscillator, are extremely sensitive but not always stable. In addition, these types are subject to the disadvantage that variations in the stray capacities of the connection leads and associated apparatus, which may vibrate themselves, are likely to produce distorted indications.

In accordance with the present invention, a variable position vibration pick-up is provided having reactive elements connected in a series resonant circuit which is driven by an external oscillator. The oscillator frequency is adjusted to or near the normal resonant frequency of the circuit so that the input impedance to the device is extremely low. Consequently, the pick-up unit itself may be connected to the oscillator through a concentric cable without encountering the difficulties which have heretofore beset radio frequency operated vibration pick-ups. The indication itslf is achieved either by varying the capacitive element or by varying the inductive element by means of the variation of a ferromagnetic core.

This invention will be better understood from the following description when considered in connection with the accompanying drawings, and its scope is indicated by the appended claims.

Referring to the drawings, Figure 1 is a circuit diagram of an embodiment of this invention; Figure 2 is a circuit diagram of an alternative embodiment in which the indicator is at a point remote from the pickup; Figure 3 is a circuit diagram of an embodiment utilizing a magnetic core to vary the inductive element; Figure 4 is the circuit diagram of a vibration pick-up utilizing a phase indicator; Figure 5 is a graph illustrating the operation of the device of Figure 4; Figure 6 is a preferred type of indicator employing a cathode ray tube; Figure 7 is an end view of a cathode ray tube indicator; Figure 8 is a sketch illustrating the mechanical construction of a pick-up device in accordance with our invention; and Figure 9 is a schematic illustration of a pick-up device for measuring tensional stresses in a vibrating or loaded element.

Referring to Fig. 1, a constant-voltage, constant-frequency oscillator 11 is connected through a concentric cable 13, or the like, to a vibration pick-up unit 15 which includes within a shielding casing 17 an inductor 19 and a capacitor 21. These reactive elements 19, 21 are serially connected between the inner and outer conductors of the concentric line. Suitable means for adjusting the resonant frequency of the reactive elements may be provided. The connection from the lower plate of capacitor 21 is preferably completed through a flexible or "pigtail" 23 in order to provide freedom of motion for the plate. The upper plate of capacitor 21 is fixedly mounted within the unit, while the lower plate is mounted on a probe 25 which extends through the casing 17 and is mounted for axial movement. The probe is connected to a surface or member 27 whose vibratory motions are to be observed. The pick-up unit 15 is suitably mounted on the structure with respect to which the vibratory motion is to be measured. Supporting members 29 maintain the unit in a fixed position with respect to ground, for example, but it is to be understood that the particular method of mounting the unit must be determined by a knowledge of which of the three types of measurements enumerated above are to be made.

A radio frequency voltmeter 31 is connected to respond to the voltage across the variable capacitor 21. The particular type of meter to be employed depends upon the nature of the desired indication. For example, if the instrument is to indicate merely static changes in position, a radio frequency voltmeter will be satisfactory. If, however, high frequency vibratory motions are to be observed, a cathode ray type voltmeter, which responds to vibrations of the highest frequency likely to be encountered, is preferred. A preferred form of indicator will be described in greater detail hereinafter.

In operating the device illustrated in Fig. 1, the frequency of oscillator 11 is adjusted to a value just above or below the resonant frequency of the reactive elements. Consequently, slight changes in the resonant frequency due to changes in the position of the movable plate of capacitor 21 have a maximum effect on the impedance of the series circuit, so that the change of voltage across either reactive element is likewise a maximum. This is illustrated by the amplitude versus frequency curve of Figure 5 to which reference is now made. The oscillator frequency is $f2$; the resonant frequency of the series is $f1$. Since the operating point is located on the slope of the resonance curve, changes in the voltage across capacitor 21 will be indicated by the meter.

An arrangement in which the indicator may be located at a more convenient point adjacent the oscillator 11 is illustrated in Fig. 2. A rectifier 33 and a resistor 35 are serially connected across capacitor 21. The rectified D.-C. voltage available across this resistor is indicated by a D.-C. meter 37 which is connected to the resistor by means of a conductor 39 which extends through the concentric cable 13. Otherwise the circuit and operation of the device illustrated in Fig. 3 is the same as that of the preceding arrangement, and need not be described again.

The embodiment of our invention illustrated in Figure 3 differs from the original embodiment in that a fixed capacitor 41 is employed while the circuit inductance is varied by means of a magnetic core 43 located in the field of inductor 19 and connected to the probe 25. The magnetic core is the powdered iron type conventionally used in radio frequency circuits. A further modification illustrated is that the indicator is a current responsive meter 44 which is connected to a transformer 45, having a low resistance primary which is serially connected in the high voltage conductor of the concentric line.

The use of a magnetic core in a vibration pick-up makes possible the analysis of vibrations of a much higher frequency than heretofore been possible with variable inductance type pick-up units. The known devices of the prior art which employ the variable inductance principle have been limited to the study of audio frequency vibrations due to the use of laminated iron cores.

In the three embodiments discussed above, it is preferable to operate the oscillator at a frequency other than the resonant frequency of the pick-up unit to prevent an ambiguity in the output indication due to the reversal of slope of the resonant curve on either side of the resonant frequency. Consequently, the preceding systems do not take full advantage of the low impedance of a series resonant circuit. It is highly desirable, however, to operate the pick-up device at its resonant frequency. In accordance with a further embodiment of our invention this is made possible by indicating the displacement in phase between the current a voltage of the resonant circuit on either side of the resonant frequency. This is accomplished by providing an indicator whose response is a function of the phase relation between the current flowing into the resonant circuit of the pick-up device and the voltage across this circuit. The cosine of this phase angle is the power factor of the circuit. Therefore the indication varies as a function of the power factor of the circuit. Referring to the phase versus frequency curve illustrated in Fig. 5, it will be seen that the phase changes rapidly in the vicinity of the resonant frequency. Furthermore, if the operating range is restricted to the substantially linear portion of the curve between the maximum and minimum points A and B, above and below resonance, the output indication will be substantially linear and the ambiguity of the amplitude system will be resolved.

Figure 4 illustrates the general principle of such a phase responsive indicator. Reference numeral 49 indicates any known phase meter. A resistor 51 connected in series with the pick-up unit input circuit provides a voltage which is at all times in phase with the current flowing through the resonant circuit. The phase of this voltage is referred to the phase of the voltage across the pick-up. As before, the characteristics of the particular phase meter employed depend upon the nature of the indication desired. A preferred phase meter, suitable for indicating the instantaneous position of the point under observation as it vibrates in space in a given period of time, is illustrated in Figure 6 to which reference is now made.

An oscillator 11 is connected to the series resonant circuit comprising a capacitor 41 and an inductor 19 of the pickup unit 15 through a resistor 51. The voltage appearing across this resistor is applied to the input of a peaking amplifier 53 which converts the alternating voltage input corresponding to the vibration under observation into sharp impulses of constant amplitude and of a frequency corresponding to the frequency of the input voltage. Such peaking amplifiers are well known in the art and need not be described in detail. The output impulses of the peaking amplifier are applied to the control electrode 55 of a cathode ray tube 57 having an electron gun 59 and the usual horizontal and vertical deflecting electrodes. The voltage across the pick-up unit is applied to the input of a wave former 61 which converts the constant frequency oscillations into a saw-tooth voltage of like frequency. The saw-tooth voltage is applied to the vertical deflecting electrodes of the cathode ray tube. A saw-tooth oscillator 63 of adjustable frequency is connected between the horizontal deflecting electrodes of the tube. The wave former 61 is a device similar to that described in U. S. Patent 2,148,096 which issued to G. B. Banks, on February 1st, 1939 on an application filed June 6, 1936. The saw-tooth oscillator is conventional, and its characteristics are well known to those skilled in the art.

The operation of this phase meter is best described by reference to Figure 7 which illustrates the general appearance of the cathode ray screen. For each cycle of the applied voltage which is derived from oscillator 11, the cathode ray beam is deflected linearly in a vertical direction along the broken line $a$ and returns rapidly to its original starting point along line $c$ in accordance with the saw-tooth voltage output of the wave former 61. Five such excursions, corresponding to five cycles of the oscillator voltage, are illustrated in Figure 7, although it is to be understood that in practice the frequency of the oscillator voltage would probably be much higher and would complete many more such vertical excursions within the same period of time. At the same time, the saw-tooth oscillator 63 deflects the cathode ray beam in a horizontal direction in a time $t$ which may be selected at will by varying the frequency of the oscillator.

It is to be noted that a battery 65 is connected in series with the output of the peaking amplifier 53, the polarity of which is such that a negative potential is applied to the control electrode 55. The amplitude of this negative potential is preferably sufficient to cut off the electron beam completely until such time as an impulse from the peaking amplifier is applied to the electrode. Consequently, the cathode ray beam is normally unable to reach the screen so that the traces indicated by the dotted lines in Figure 7 do not actually appear, but are only illustrated to show the manner in which the cathode ray beam would be deflected if it were permitted to reach the screen. At least once during each cycle of the vertical scanning voltage, however, an impulse is applied to the electrode which permits the beam to strike the luminescent screen and produce a point of light $b$, whose position in a vertical direction depends upon the time phase of the impulses supplied by the peaking amplifier 53 and the vertical scanning voltage supplied by the wave former 61. Since this time phase is in turn determined by the phase of the current and voltage flowing in and applied to the resonant circuit of the pick-up unit, it will be appreciated that the positions of the points of light which appear at successive time intervals are true indications of the actual position of the vibrating member under test.

Figure 8 represents the embodiments of a pick-up unit utilizing the capacity variation principle. The test probe 25 is mounted within the casing 17 by means of two spiders 67 and 69 which permit axial movement of the probe. One of the condenser plates is mounted on the probe 25. Other elements of the pick-up unit bear similar reference numerals to corresponding parts in the other figures of the drawings and need not be described in detail. Particular attention is directed, however, to capacitor 71 which is connected across inductor 19. This capacitor is a temperature compensating capacitor which tends to maintain the resonant frequency of the unit constant in the presence of variations in temperature. In addition, a unique arrangement for attaching the test probe 25 to the vibrating surface 27 is illustrated. The free end of the test probe is held firmly against the vibrating surface by means of a light rubber suction cup 73. The test probe itself extends through the center of the suction cup and is held firmly against the vibrating surface 27 so that the vibrations are not absorbed by the suction cup. This arrangement permits the probe to be attached quickly to any surface, and it will be appreciated that the probe will follow the movement of the vibrating object without the necessity of applying pressure to the probe. Since the whole vibrating structure is extremely light, the load on the vibrating system is minimized.

Figure 9 represents a pick-up device which is suitable for measuring the static tension, or the tension produced by vibratory motion, in a member under stress. In this case two test probes 75 and 79 are provided, which are connected by means of a pair of suction cups to spaced points on the member 81. Two sets of condenser plates are connected to the two test probes so that the capacity is varied as a function of the relative displacement of the two test probes. As before, the capacity is serially connected in circuit with an inductor 19 which is operated at or near the resonant frequency of oscillator 11.

We claim as our invention:

1. A device of the character described comprising a vibration pick-up element including a series resonant circuit having a frequency determining element adapted to be displaced by an object whose position is to be indicated, means including a pair of conductors and a remote current source for applying an alternating current of constant frequency to said circuit, the frequency of said current being equal to the normal resonant frequency of said circuit, and means responsive to changes in the power factor of said alternating current for indicating the displacement of said element.

2. A device of the character described comprising a source of alternating current, inductive and capacitive elements connected across said source and series resonant at the frequency of said alternating current, means responsive to changes in the position of an object for varying the resonant period of said series circuit, and means responsive to changes in the power factor of said alternating current for indicating instantaneous changes in the position of said object.

3. A position sensitive indicator comprising a source of alternating current of fixed frequency, reactive elements connected across said source, said elements being series resonant at said fixed frequency, means for varying the reactance of one of said elements in accordance with variations in the position of an object to vary the phase of the current flowing through said reactive elements with respect to the voltage of said source, and means for indicating the instantaneous position of said object as a function of said phase.

4. A position sensitive indicator comprising a source of alternating current of fixed frequency, reactive elements connected across said source, said elements being series resonant at said fixed frequency, means for varying the reactance of one of said elements in accordance with variations in the position of an object, means for deriving a voltage in time phase with the current flowing through said reactive elements, and means for indicating the relative phase of said derived voltage and the voltage of said source.

5. A position sensitive indicator comprising a source of alternating current of fixed frequency, reactive elements connected across said source, said elements being series resonant at said fixed frequency, a magnetic core for varying the reactance of one of said elements in accordance with variations in the position of an object, to vary the phase of the current flowing through said reactive element with respect to the voltage of said source, and means for indicating the position of said object as a function of said phase.

6. A position sensitive indicator comprising a source of alternating current of fixed frequency, reactive elements connected across said source, said elements being series resonant at said fixed frequency, means for varying the reactance of one of said elements in accordance with variations in the position of an object, to vary the phase of the currents flowing through said reactive elements with respect to the voltage of said source, a cathode ray oscillograph having deflecting plates and a control electrode for varying the intensity of said ray, means for deflecting said ray in one direction at the frequency of said alternating current, means for deflecting said ray in another direction at a different frequency, and means connected to said control electrode for varying the intensity of said ray at successive intervals which are determined by said variation of phase.

7. An indicator of the character described comprising a transmission line for connection to a source of alternating current, reactive elements connected in series with said line and normally resonant at a predetermined frequency, means responsive to the position of an object for varying the resonant frequency of said elements to produce a change in the phase of said alternating current in said line, and phase responsive means connected to said line for indicating the instantaneous position of said object.

EUGENE W. PIKE.
ARTHUR W. VANCE.